(12) United States Patent
Rouleau et al.

(10) Patent No.: US 11,807,290 B2
(45) Date of Patent: Nov. 7, 2023

(54) SYSTEMS AND METHODS OF IMPROVED SPEED REGULATION FOR POWER RAKE COLUMNS

(71) Applicant: Steering Solutions IP Holding Corporation, Saginaw, MI (US)

(72) Inventors: James E. Rouleau, Burt, MI (US); Edward A. Cana, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 349 days.

(21) Appl. No.: 16/826,749

(22) Filed: Mar. 23, 2020

(65) Prior Publication Data

US 2021/0291894 A1    Sep. 23, 2021

(51) Int. Cl.
| | | |
|---|---|---|
| *B62D 1/181* | (2006.01) | |
| *B62D 15/02* | (2006.01) | |
| *H02P 6/24* | (2006.01) | |
| *B62D 5/04* | (2006.01) | |

(52) U.S. Cl.
CPC ......... *B62D 1/181* (2013.01); *B62D 15/0215* (2013.01); *H02P 6/24* (2013.01); *B62D 5/046* (2013.01)

(58) Field of Classification Search
None
See application file for complete search history.

(56) References Cited

U.S. PATENT DOCUMENTS

| | | | | |
|---|---|---|---|---|
| 6,782,316 B2 * | 8/2004 | Breed | ................. | G01S 15/88 |
| | | | | 701/45 |
| 7,597,357 B2 * | 10/2009 | Barcat | ................. | B62D 1/181 |
| | | | | 74/495 |
| 2003/0116362 A1 * | 6/2003 | Breed | ................. | B60N 2/853 |
| | | | | 177/144 |
| 2007/0176405 A1 * | 8/2007 | Barcat | ................. | B62D 1/181 |
| | | | | 280/775 |
| 2020/0039583 A1 * | 2/2020 | Fazekas | ............ | B62D 15/025 |
| 2021/0291894 A1 * | 9/2021 | Rouleau | ............ | B62D 15/0215 |

(Continued)

FOREIGN PATENT DOCUMENTS

| | | | | | |
|---|---|---|---|---|---|
| CN | 110337400 | A | * | 10/2019 | ............ B62D 1/181 |
| CN | 113437906 | A | * | 9/2021 | ......... B62D 15/0215 |
| CN | 110337400 | B | * | 1/2022 | ............ B62D 1/181 |

(Continued)

OTHER PUBLICATIONS

Translation of Official Letter corresponding to German Patent Application 10 2021 106 697.2 dated Jan. 25, 2023, 13 pages.

*Primary Examiner* — Kevin R Steckbauer
(74) *Attorney, Agent, or Firm* — Dickinson Wright PLLC (57) ABSTRACT

A method for controlling an electric machine includes, in response to receiving a command signal, determining a position of a steering column. The method also includes determining a desired direction of the steering column based on the command signal. The method also includes determining a voltage corresponding to motion of the steering column from the position and desired direction. The method also includes applying a pulse width modulated signal to the electric machine based on the position of the steering column, the desired direction of the steering column, and the voltage. The method also includes selectively adjusting the pulse width modulated signal based on a change in the voltage.

14 Claims, 7 Drawing Sheets

(56) References Cited

U.S. PATENT DOCUMENTS

2021/0354744 A1* 11/2021 Choi ................. B60W 10/20
2022/0355849 A1   11/2022 Schwing

FOREIGN PATENT DOCUMENTS

| DE | 102019116760 B3 |   | 8/2020  |              |
|----|-----------------|---|---------|--------------|
| DE | 102019116760 B3 | * | 8/2020  | ............. B62D 1/181 |
| DE | 102019004840 A1 | * | 1/2021  | ............. B62D 1/181 |
| DE | 102021106697 A1 | * | 9/2021  | ......... B62D 15/0215 |
| DE | 102020208164 A1 | * | 12/2021 |              |
| EP | 1634795 B1      | * | 5/2009  | ............. B62D 1/181 |
| EP | 3585672 B1      | * | 6/2021  | ............. B62D 1/181 |
| GB | 2243435 A       | * | 10/1991 | ............. B62D 1/181 |
| JP | 2007110788 A    | * | 4/2007  |              |
| JP | 2007110788 A    |   | 4/2007  |              |
| JP | 2021178544 A    | * | 11/2021 | ........... B62D 5/0457 |
| WO | WO-2018153443 A1 | * | 8/2018  | ............. B62D 1/181 |
| WO | WO-2020254586 A1 | * | 12/2020 | ............. B62D 1/181 |
| WO | WO-2021008950 A1 | * | 1/2021  | ............. B62D 1/181 |
| WO | WO-2021165217 A1 | * | 8/2021  | ............. B62D 1/181 |
| WO | WO-2021230159 A1 | * | 11/2021 | ........... B62D 5/0457 |
| WO | WO-2022002768 A1 | * | 1/2022  |              |

\* cited by examiner

SYSTEMS AND METHODS OF IMPROVED SPEED REGULATION FOR POWER RAKE COLUMNS

TECHNICAL FIELD

This disclosure relates to speed regulation for power rake columns.

BACKGROUND

Conventional steering columns can be manually operated or electronically adjusted via actuators. Depending on the user requirements, such columns can be adjusted in various directions, including the telescope (i.e., along the axis of the column), rake (i.e., vertically) and/or tilt (i.e., pivot angle) directions. Steering columns can telescope in several ways. For example, some steering columns telescope via telescoping jackets or shafts. Other examples of steering columns can telescope via a fixed shaft and a translating jacket assembly. Steering columns with a rake adjustment capability adjust the rake angle of the steering column with respect to a pivot axis.

Lifting assemblies for power rake columns of vehicles, such as cars, trucks, sport utility vehicles, crossovers, minivans, or other suitable vehicles may utilize a bell crank driven by a brushed permanent magnet direct current (PMDC) motor to control the vertical position of the steering wheel. The kinematics of the bell crank create a non-linear relationship between the motor speed and speed of the rake column. In addition, as is generally characteristic of PMDC motors, the speed of the motor is inversely proportional to the torque output. The position and desired direction of movement of the steering column often affects the torque required by the motor, due, at least in part, to gravity. Typically, lifting assemblies are designed to make the velocity of the rake column as insensitive as possible to varying loads. However, the combination of the kinematics of the bell crank and the characteristics of the motor typically creates a rake column that changes speed and produces a varying motor noise.

SUMMARY

This disclosure relates to speed regulation for power rake columns.

An aspect of the disclosed embodiments includes an apparatus for controlling an electric machine. The apparatus includes a processor and a memory. The memory includes instructions that, when executed by the processor, cause the processor to: in response to receiving a command signal: determine a position of a steering column; determine a desired direction of the steering column based on the command signal; determine a voltage corresponding to motion of the steering column from the position and desired direction; apply a pulse width modulated signal to the electric machine based on the position of the steering column, the desired direction of the steering column, and the voltage; and selectively adjust the pulse width modulated signal based on a change in the voltage.

Another aspect of the disclosed embodiments includes a method for controlling an electric machine. The method includes, in response to receiving a command signal, determining a position of a steering column. The method includes determining a desired direction of the steering column based on the command signal. The method includes determining a voltage corresponding to motion of the steering column from the position and desired direction. The method includes applying a pulse width modulated signal to the electric machine based on the position of the steering column, the desired direction of the steering column, and the voltage. The method includes selectively adjusting the pulse width modulated signal based on a change in the voltage.

Another aspect of the disclosed embodiments includes an apparatus for controlling an electric machine. The apparatus includes a processor and a memory. The memory includes instructions that, when executed by the processor, cause the processor to: in response to receiving a command signal: determine a position of a steering column; determine a desired direction of the steering column based on the command signal; determine a voltage corresponding to motion of the steering column from the position and desired direction; modify an output signal to the electric machine based on the position of the steering column, the desired direction of the steering column, and the voltage; and control a speed of the electric machine based on the output signal.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, conventional steering columns can be manually operated or electronically adjusted via actuators.

Depending on the user requirements, such columns can be adjusted in various directions, including the telescope (i.e., along the axis of the column), rake (i.e., vertically) and/or tilt (i.e., pivot angle) directions. Steering columns can telescope in several ways. For example, some steering columns telescope via telescoping jackets or shafts. Other examples of steering columns can telescope via a fixed shaft and a translating jacket assembly. Steering columns with a rake adjustment capability adjust the rake angle of the steering column with respect to a pivot axis.

Lifting assemblies for power rake columns of vehicles, such as cars, trucks, sport utility vehicles, crossovers, minivans, or other suitable vehicles typically utilize a bell crank driven by a brushed permanent magnet direct current (PMDC) motor to control the vertical position of the steering wheel. The kinematics of the bell crank create a non-linear relationship between the motor speed and speed of the rake column. In addition, as is characteristic of PMDC motors, the speed of the motor is inversely proportional to the torque output. The position and desired direction of the steering column often affects the torque required by the motor, due, at least in part, to gravity. Typically, lifting assemblies are designed to make the velocity of the rake column as insensitive as possible to varying loads. However, the combination of the kinematics of the bell crank and the characteristics of the motor typically creates a rake column that changes speed and produces a varying motor noise.

A kinematic prediction algorithm is important to produce a rake column with a uniform speed and sound. In order to provide a uniform rake column speed, the speed of the motor is controlled via pulse width modulation (PWM) to create a pulse width modulated signal. The average voltage of the pulse width modulated signal may be determined by the duty cycle and limited by the system voltage. For example, during locations of low torque requirements, the average voltage of the pulse width modulated signal can be reduced by reducing the duty cycle, preventing the motor from unwanted acceleration. In locations of high torque requirements, the average voltage can approach the system voltage to maximize the available torque and prevent the motor from undue slowing. Accordingly, systems and methods, such as those described herein, are configured to generate a pulse width modulated signal based on the position of the steering column, the command direction of the steering column, and the voltage. In some embodiments, the systems and methods described herein may be configured to selectively adjust the speed of the motor based on the voltage.

In some embodiments, the systems and methods described herein may be configured to, in response to receiving a command signal, determine a position of a steering column. The systems and methods described herein may be configured to determine a desired direction of the steering column based on the command signal. The systems and methods described herein may be configured to determine a voltage corresponding to motion of the steering column from the position and desired direction. The systems and methods described herein may be configured to apply a pulse width modulated signal to the electric machine based on the position of the steering column, the desired direction of the steering column, and the voltage. The systems and methods described herein may be configured to selectively adjust the pulse width modulated signal based on a change in the voltage.

In some embodiments, the systems and methods described herein may be configured to control an electric machine comprises a processor and a memory. The systems and methods described herein may be configured to receive a command signal. The systems and methods described herein may be configured to determine a position of a steering column. The systems and methods described herein may be configured to determine a desired direction of the steering column based on the command signal. The systems and methods described herein may be configured to determine a voltage corresponding to motion of the steering column from the position and desired direction. The systems and methods described herein may be configured to modify an output signal to the electric machine based on the position of the steering column, the desired direction of the steering column, and the voltage. The systems and methods described herein may be configured to control a speed of the electric machine based on the output signal.

Figure 1:
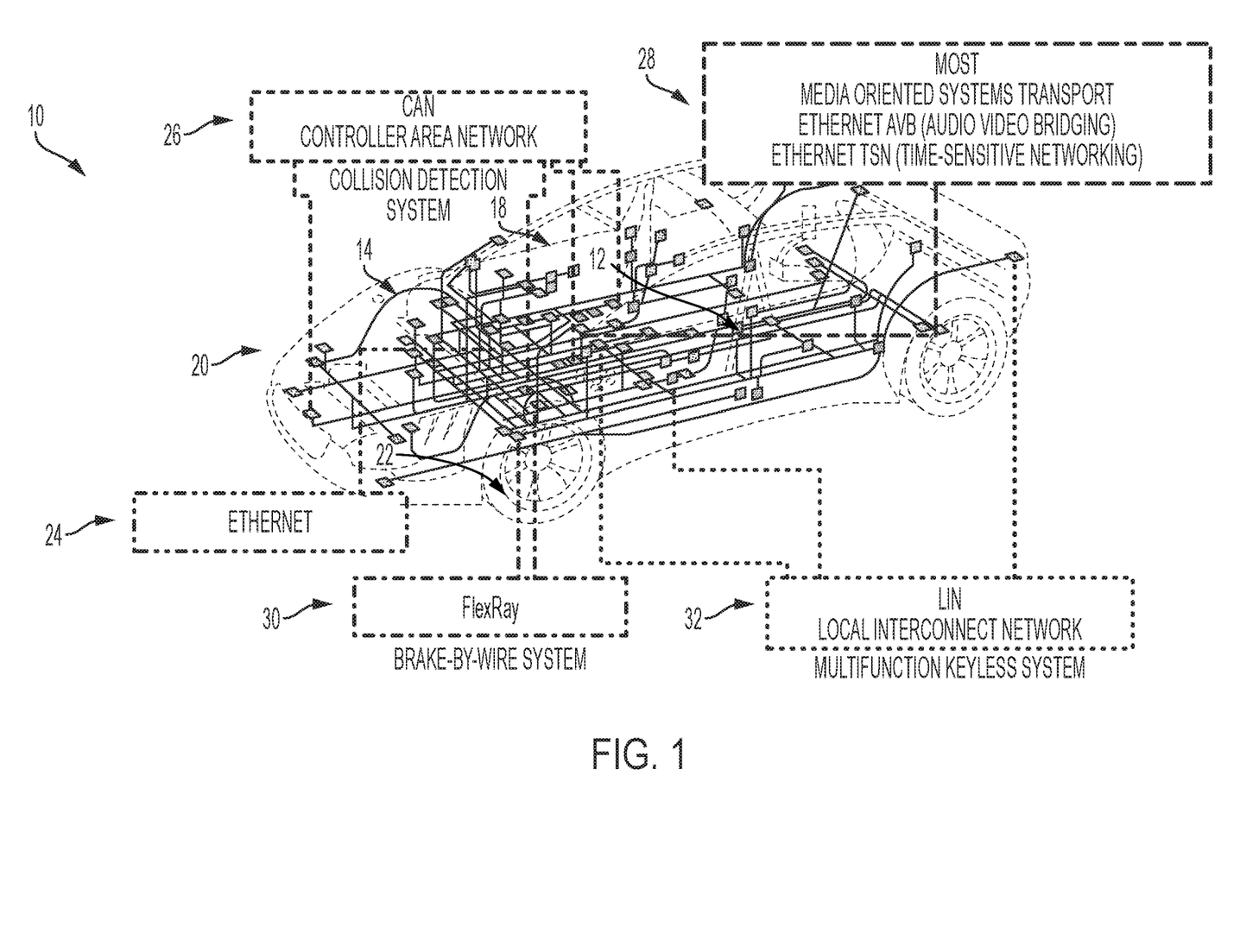
FIG. 1 generally illustrates a vehicle according to the principles of the present disclosure.

Referring now to the figures, where the technical solutions will be described with reference to specific embodiments, without limiting the same, FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on a rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or a fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network component (CAN) 26, a media oriented systems transport component (MOST) 28, a FlexRay component 30 (e.g., brake-by-wire system, and the like), and a local interconnect network component (LIN) 32. The vehicle 10 may use the CAN 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 2:
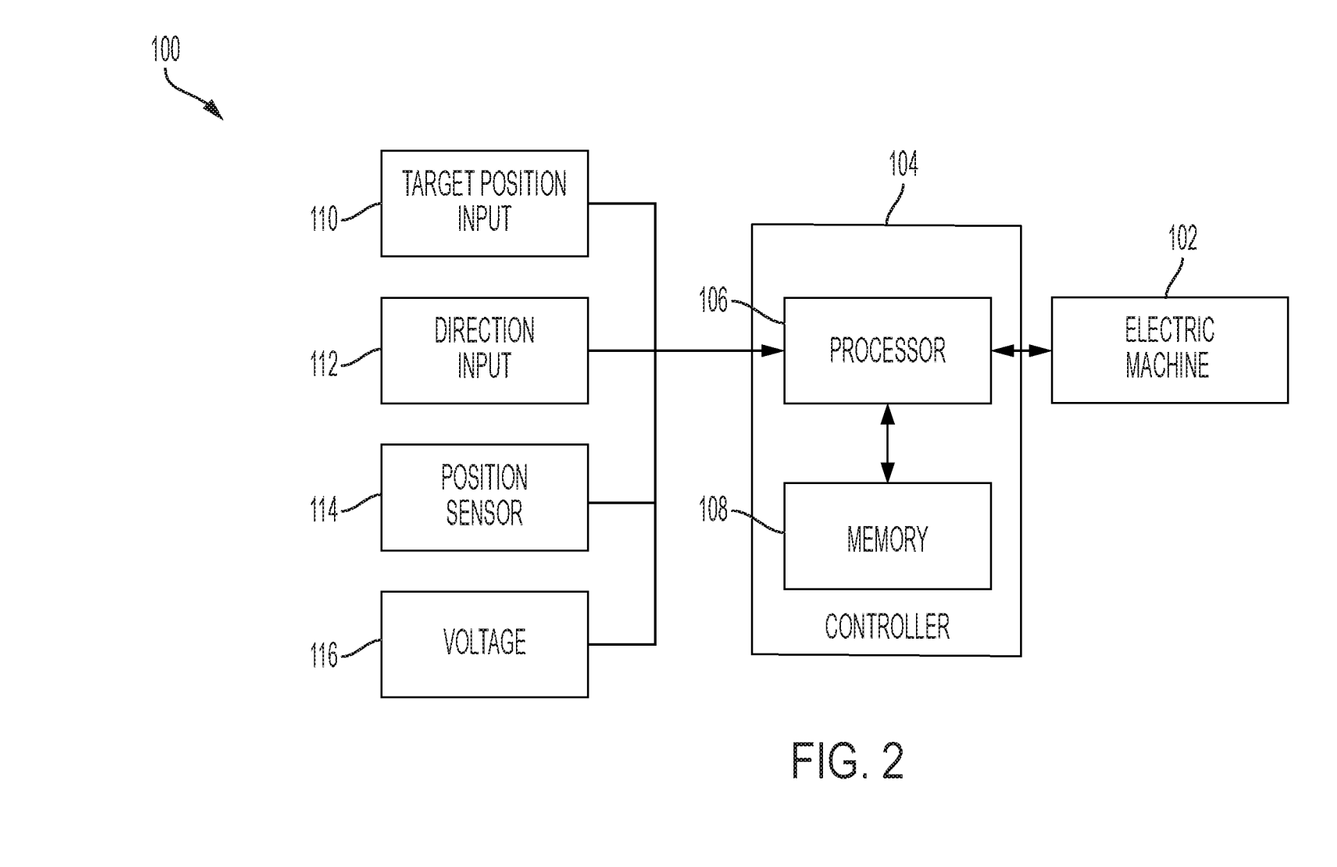
FIG. 2 generally illustrates a system for controlling an electric machine according to the principles of the present disclosure.

The vehicle 10 may include a system 100 for controlling an electric machine 102, as is generally illustrated in FIG. 2. As will be appreciated from the disclosure herein, the electric machine is a motor or a motor assembly that is responsible for actuating motion of the bell crank and steering column that are discussed in detail below. The system 100 may include a controller 104. The controller 104 may include an electronic control unit or other suitable controller 104. The controller 104 may include a processor 106 and memory 108 that includes instructions that, when executed by the processor 106, cause the processor 106 to, at least, control the speed of the electric machine 102. The processor 106 may include any suitable processor, such as those described herein. The memory 108 may comprise a single disk or a plurality of disks (e.g., hard drives), and includes a storage management module that manages one or more partitions within the memory 108. In some embodiments, memory 108 may include flash memory, semiconductor (solid state) memory or the like. The memory 108 may include Random Access Memory (RAM), a Read-Only Memory (ROM), or a combination thereof.

The system 100 may include a target position input 100, a direction input 112, a position sensor 114, and a voltage 116. The target position input 100 may reflect a desired position of a steering column 118 and may be generated from a pre-defined setting based on a user profile or may be a manually entered value. The user profile may correspond to a wireless signal having a specific radio-frequency identification code or other wireless code. The wireless code may be stored on a key fob, phone, or other electronic device and may provide the target input position to the controller 104 upon a determination that the particular wireless signal is present. The direction input 112 provides a desired direction of the steering column 118 which may be generated via a manual interface, such as a switch, button, or human-machine interface (HMI) of the vehicle 10. The voltage 116 may provide a voltage level of the system 100 and/or may be a voltage of or derived from an electrical power source of the vehicle 10, such as a battery. Alternatively, the voltage 116 may be local to the system 100, and may vary between a range of 5-20 volts, but may alternatively be in a range of 9-16 volts. It should be appreciated that the system 100 may be integral or connected to a Column Position Module (CPM) of the vehicle 10. In some embodiments, the position sensor 114 is monitored by the CPM and the position of the steering column 118 is provided via the CPM.

The electric machine 102 may be the power source for moving the steering column 118 and may include one or more measurement devices and/or sensors configured to measure various characteristics and/or parameters of the electric machine 102. The electric machine 102 may be configured to measure and communicate, to the controller 104 (e.g., to the processor 106) various dynamic parameter values, as will be described.

Figure 3:
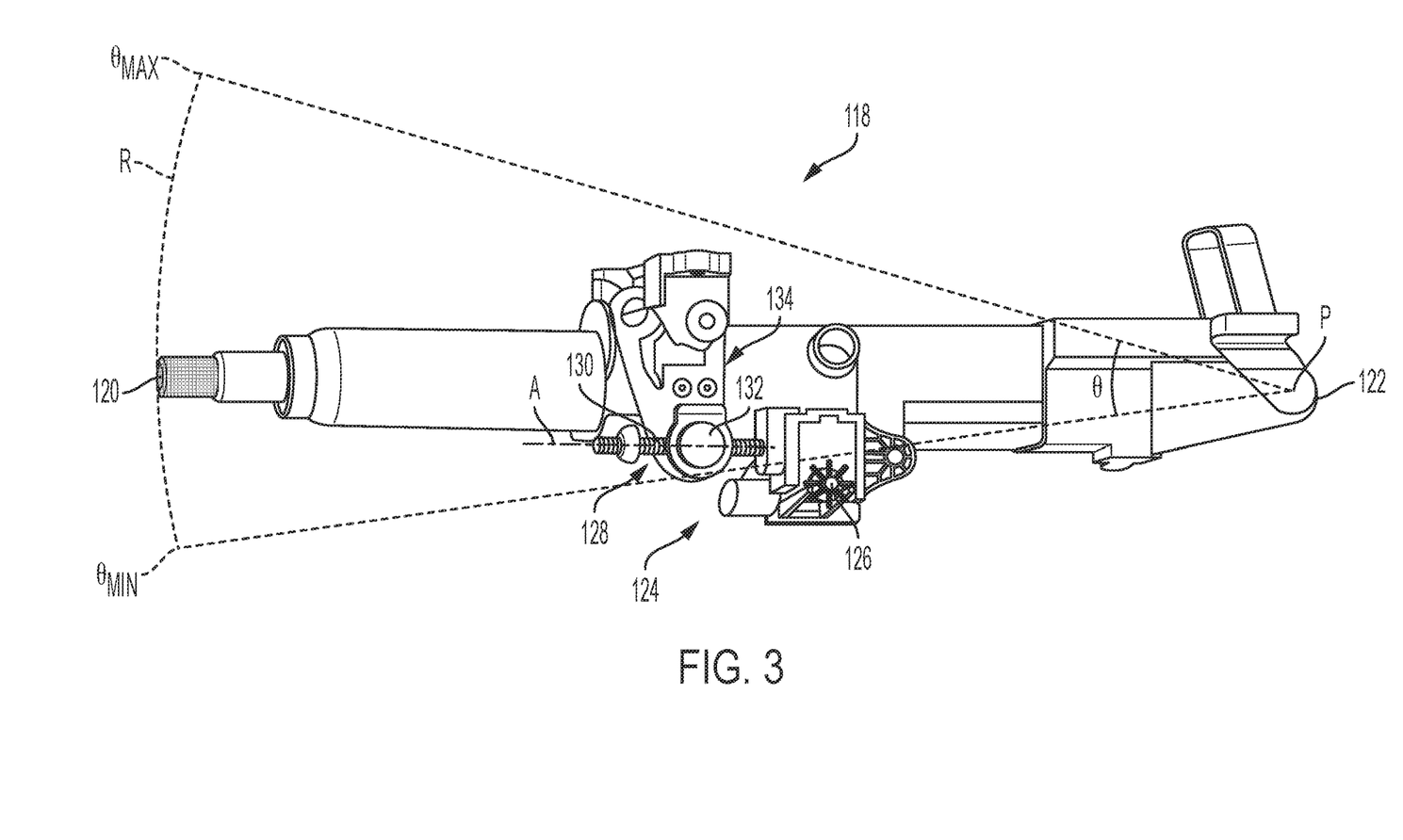
FIG. 3 generally illustrates a side view of a steering column according to the principles of the present disclosure.

FIG. 3 generally illustrates a side view of a steering column 118 of the vehicle 10 according to the principles of the present disclosure. The steering column 118 may be a rake column. The steering column 118 may extend between a first end 120 and a second end 122 and include a steering interface, such as a steering wheel or other mechanical or electrical interface device, connected at the first end 120 to control the direction of the vehicle 10. A lifting assembly 124 may be operatively connected to the steering column 118 for lifting and lowering the steering column 118, thereby causing the steering column 118 to rotate relative to a pivot axis P. The pivot axis P may be disposed at any point along the steering column 118. In one embodiment, the pivot axis P may be disposed at the second end 122 of the steering column 118.

The lifting assembly 124 may include an actuator 126 operatively connected to the electric machine 102. The actuator 126 may include a screw shaft assembly 128 or may include any number of linear actuators, such as a ball screw assembly. With reference to the figures, the screw shaft assembly 128 may include a grooved shaft 130 extending along a center axis A and a nut 132 moveably engaged with the shaft 130. A bell crank 134 may be coupled to the nut 132 and the steering column 118. In the example shown, to lift the steering column 118, the electric machine 102 may rotate the shaft 130 about the center axis A, thereby moving the nut 132 along the center axis A. The position of the nut 132 on the center axis A may correspond to a position of the first end 120. In other words, as the nut 132 moves along the shaft 130, the bell crank 134 may push the steering column 118 upward, thereby causing the steering column 118 to rotate about the pivot axis P and form a rake angle θ. The rake angle θ is variable between a minimum rake angle $\theta_{MIN}$ and a maximum rake angle $\theta_{MAX}$, forming a rake motion profile R. The rake motion profile R may correspond to a linear position range of the actuator 126 (i.e., the position of the nut 132 on the shaft 130) of 35 millimeters (mm), with an actuator position of −18 mm corresponding to the minimum rake angle $\theta_{MIN}$ and 17 mm corresponding to the maximum rake angle $\theta_{MAX}$. It should be appreciated that the relationship between the actuator position and the rake angle θ may be non-linear and that the rake angle θ may correspond to a position of the steering column 118.

In some embodiments, the kinematics of the bell crank 134 creates a motion that does not have a proportionally constant angular velocity output with a constant linear velocity input. Because the actuator 126 may be a linear actuator, the angular velocity of the steering column 118 and the force on the actuator 126 changes based on the position and the direction of motion of the steering column 118. For example, if the velocity of the nut 132 is constant along the center axis A, the speed of the steering column 118 varies. Further, the force $F_x$ required to lift the steering column 118 may be much greater at a position near the minimum rake angle $\theta_{MIN}$ than a position near the maximum rake angle $\theta_{MAX}$. In addition, more force may be required to lift the steering column 118 (i.e., to rotate the steering column 118 upwards) than to lower it (i.e., to rotate the steering column 118 downwards).

Figure 4:
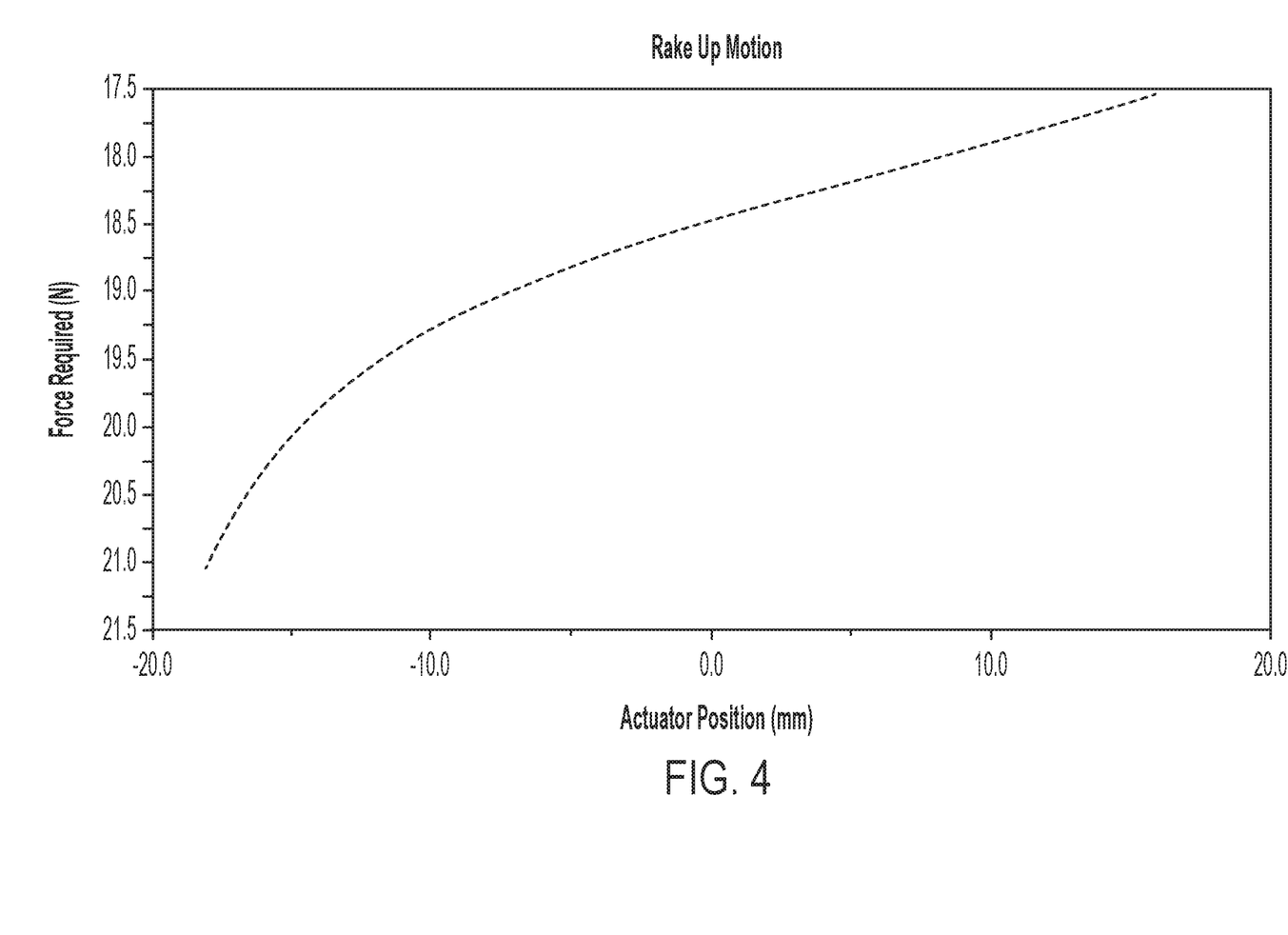
FIG. 4 is a graphical representation of required force to lift the steering column based on an actuator position, in one example, according to the principles of the present disclosure.
Figure 5:
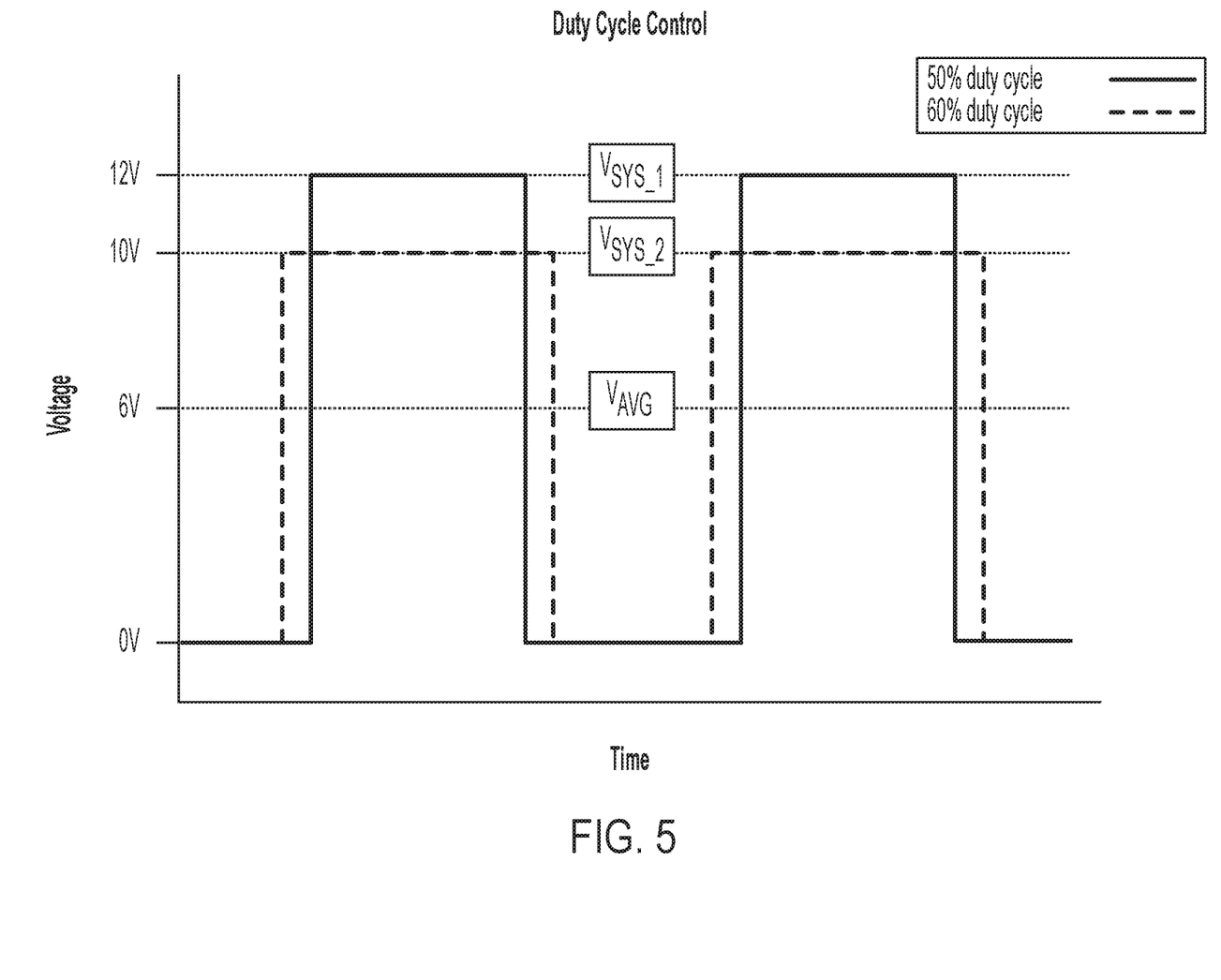
FIG. 5 illustrates an example of duty cycle control according to the principles of the present disclosure.

In some embodiments, a force $F_x$ required to lift the steering column 118 is a function of the rake angle $\theta$ and the desired direction of the steering column 118, as is illustrated in Equation (1):

$$F_x = f(\theta, d)$$

where $F_x$ is the force required to lift/lower the steering column 118, $\theta$ is the rake angle corresponding to the position of the steering column 118, and d is the desired direction of the steering column 118. As illustrated by example in FIG. 4, there may be a non-linear relationship between the force $F_x$ required to lift the steering column 118 and the actuator position. The force $F_x$ required to lift the steering column 118 may differ as much as 15% between the minimum rake angle $\theta_{MIN}$ and the maximum rake angle $\theta_{MAX}$. It will be appreciated that the lifting assembly 124 may include another mechanical or electro-mechanical device other than a bell crank 134 to achieve a known relationship between the position of the steering column 118 and the force $F_x$ required to lift the steering column 118. In some embodiments, the lifting assembly 124 may be mechanically optimized to keep the dynamic range required as small as possible.

In some embodiments, the force variation across the motion profile R may be further caused by the type of power source (e.g., the type of electric machine 102) configured to drive the actuator 126. For example, the electric machine 102 may be a brushed permanent-magnet direct current (PMDC) electric motor. One characteristic of a PMDC electric motor is that the slope of the operating curve always has the armature speed (RPM) of the motor inversely proportional to the torque output when operating at a constant voltage. It should be appreciated that the electric machine 102 may alternatively be a servo motor, a linear actuator, an AC motor or any other electro-mechanical device.

The motor speed may therefore be lower when the force $F_x$ required to lift the steering column 118 is great, for example, when the steering column 118 is at a low rake angle $\theta$. Similarly, the motor speed may be higher when the force $F_x$ required to the lift the steering column 118 is less, for example, when the steering column 118 is at a high rake angle $\theta$. The net effect is that changing loads results in changing operating speeds with a constant voltage input. Under operating conditions, the torque applied by the motor may be at least the force $F_x$ required to lift the steering column 118 (i.e., the load).

In some embodiments, the motor may be powered via an electric signal having a voltage $V_{SYS}$. The voltage $V_{SYS}$, when applied to the motor, causes the motor to rotate at the motor speed. The motor speed may be proportional to a voltage of the signal when the load does not exceed the torque capacity of the motor. For example, when the signal has a higher voltage the motor has a higher motor speed than when the signal has a lower voltage. In some embodiments, the signal may be a direct current signal. Pulse width modulation (PWM) may be applied to the signal to generate a pulse width modulated signal having an adjustable duty cycle. An average voltage $V_{AVG}$ may be formed based on the duty cycle of the pulse width modulated signal and the voltage $V_{SYS}$. The pulse-width modulated signal may reduce the time that the voltage $V_{SYS}$ is applied to the motor. Thus, the motor speed may be proportional to the average voltage $V_{AVG}$ under ordinary operating conditions.

In some embodiments, the pulse width modulated signal is controlled via an algorithm. The algorithm may be based on kinematic prediction specific to the mechanical design. For example, at positions of low torque requirements (e.g., at greater angular positions), the average voltage $V_{AVG}$ of the pulse width modulated signal may be lessened by reducing the duty cycle to prevent the motor from acceleration. Similarly, at positions of high torque requirements (e.g., at lesser angular positions), the average voltage $V_{AVG}$ of the pulse width modulated signal may approach the voltage $V_{SYS}$ by increasing the duty cycle to prevent deceleration. In this manner, the algorithm may provide a constant velocity across the motion profile R, regardless of position. Since the kinematic prediction is a function of the rake position, efficiency as a function of position may be used to increase or decrease the effort (i.e., torque) commanded to the motor via the pulse width modulated signal. In some embodiments, the algorithm may allow the electric machine 102 to compensate where the mechanics cannot.

In some embodiments, the maximum speed of the steering column 118 at the position where there is the most force on the lifting assembly 124 (e.g., the minimum rake angle $\theta_{MIN}$) may determine the speed at each position on the motion profile R. For example, the speed of the steering column 118 as a result of a 100% duty cycle of the pulse width modulated signal at the minimum rake angle $\theta_{MIN}$ may be the speed of the steering column 118 across the motion profile R. In some embodiments, the position of highest load is the lowest position on the motion profile R because the force of gravity on the steering column 118 may be greatest at that position. The desired direction (i.e., lifting or lowering) may further be incorporated into the algorithm to compensate for the weight of the steering wheel, the steering column 118, and the airbag.

In some embodiments, the pulse width modulated signal is based on the voltage $V_{SYS}$. The voltage $V_{SYS}$ may provide an upper limit to the average voltage $V_{AVG}$ of the pulse width modulated signal and therefore control the applicable range of the average voltage $V_{AVG}$ of the pulse width modulated signal. For example, if the voltage $V_{SYS}$ is 12 volts, then the average voltage $V_{AVG}$ may be variable between 0-12 volts based on the duty cycle (e.g., 50% duty cycle=6V average). Similarly, if the voltage $V_{SYS}$ is 11 volts, then the average voltage $V_{AVG}$ may be variable between 0-11 volts based on the duty cycle (e.g., 50% duty cycle=5.5V average). In some embodiments, the maximum power output of the electric machine 102 is 12 volts, and the minimum power output corresponds to 0V. Accordingly, the algorithm may compensate for changes in the voltage $V_{SYS}$ to maintain the desired motor speed profile. In some embodiments, the operating voltage of the electric machine 102 may be 12V to −12V. In some embodiments, the system 100 may include an H-bridge module which may be configured to switch the polarity of the output signal. Switching the polarity of the output signal (e.g., the pulse width modulated signal) may change the polarity of the voltage to invert the motor speed. For example, a negative voltage may cause the motor to run in an opposing direction relative to the direction the motor runs when a positive voltage is applied to the motor.

Figure 6:
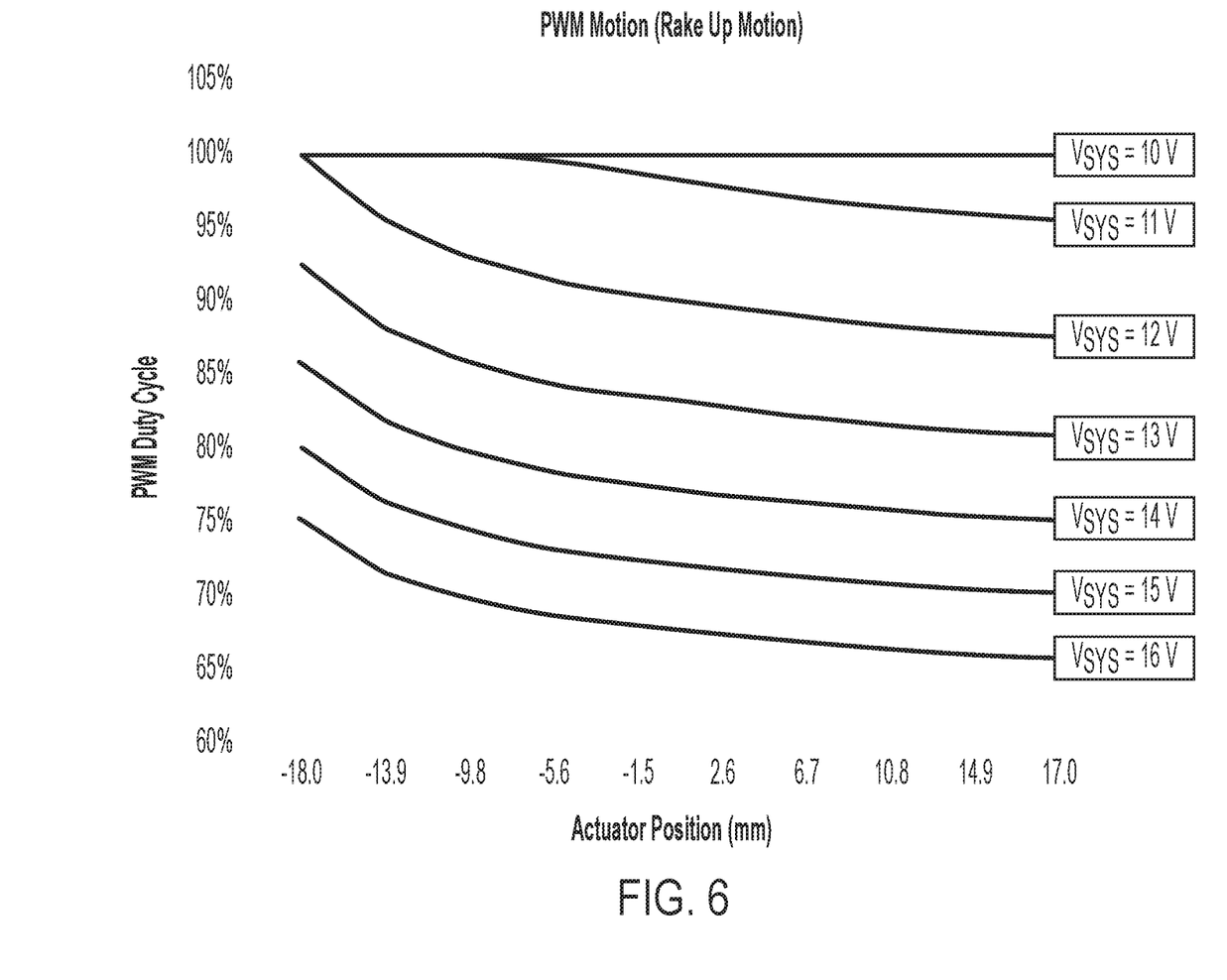
FIG. 6 illustrates an example of a duty cycle schedule for an upward rake motion across several voltages according to the principles of the present disclosure.

An example of duty cycle control is illustrated in FIG. 6. In the example illustrated, the average voltage $V_{AVG}$ is maintained constant despite a difference in the voltage $V_{SYS}$ due to an increase in the duty cycle from 50% at 12 volts ($V_{SYS\_1}$) to 60% at 10 volts ($V_{SYS\_2}$). It should be appreciated that, while the pulse width of each of $V_{SYS\_1}$ and $V_{SYS\_2}$ is shown as overlaid with one another, the pulses may be configured to trigger at the same time.

In some embodiments, the pulse width modulated signal is a function of the rake angle θ, the desired direction of the steering column 118, and the voltage $V_{SYS}$, as is illustrated in Equation (2):

$$PW = f(\theta, d, V_{SYS})$$

where PW is the pulse width of the pulse width modulated signal, θ is the position of the steering column 118, d is the desired direction of the steering column 118, and $V_{SYS}$ is the voltage of the system 100. In some embodiments, the algorithm may generate a simple polynomial relationship between the duty cycle and the speed of the steering column 118 at a voltage $V_{SYS}$ of at least approximately 12 volts. In some embodiments, the algorithm may generate a unique polynomial fit to the kinematics of the mechanical system.

FIG. 6 illustrates the duty cycle schedule for an upward rake motion from $\theta_{MIN}$ to $\theta_{MAX}$ at various voltages $V_{SYS}$. In some embodiments, a voltage $V_{SYS}$ below 12 volts may not have modification available, while a voltage $V_{SYS}$ of at least 12 volts may be fully modifiable to provide a constant speed to the steering column 118. Further, there may be anticipated saturation at voltages $V_{SYS}$ below 12V, and voltages $V_{SYS}$ above 12V may be attenuated to achieve uniform performance in all voltages $V_{SYS}$ above 12V. It should be appreciated that the algorithm may be continuous over all voltage ranges, and that the voltage curves illustrated in FIG. 6 are shown to illustrate typical voltage ranges. A rake down curve may be similar to the example illustrated in FIG. 6, with a shift toward lower PWM duty cycles. It should also be appreciated that the algorithm may be added to soft start and soft stop procedures and may further be incorporated to compensate for common mechanical efficiency. In some embodiments, the average voltage $V_{AVG}$ may not be increased beyond the voltage $V_{SYS}$, but may be regulated below the voltage $V_{SYS}$ via PWM. In addition, it should be appreciated that the voltage $V_{SYS}$ may change during motion of steering column 118, and the system 100 may be configured to actively compensate for the change in voltage $V_{SYS}$.

In some embodiments, the algorithm is open loop and subject to noise factors beyond the algorithm prediction. For instance, a load applied to the steering wheel while the steering column 118 is moving or stopped may not be compensated, such as the force of an operator's hand or a physical obstruction. In some embodiments, improved feedback regarding velocity may be included in closed-loop control. In some embodiments, the electric machine 102 may be capable of providing a feedback status to the controller 104, including actual motor speed, heat dissipation, actual torque, acceleration, or any other feedback status. An encoder may be included with the system 100 to provide speed, acceleration, and positional data of the electric machine 102 to the controller 104. The electric machine 102 may be controlled by the controller 104 in full or in part based on the feedback status or the speed, acceleration, or positional data. In some embodiments, open-loop control may provide a less costly system and the algorithm may account for primary factors without requiring velocity monitoring.

Figure 7:
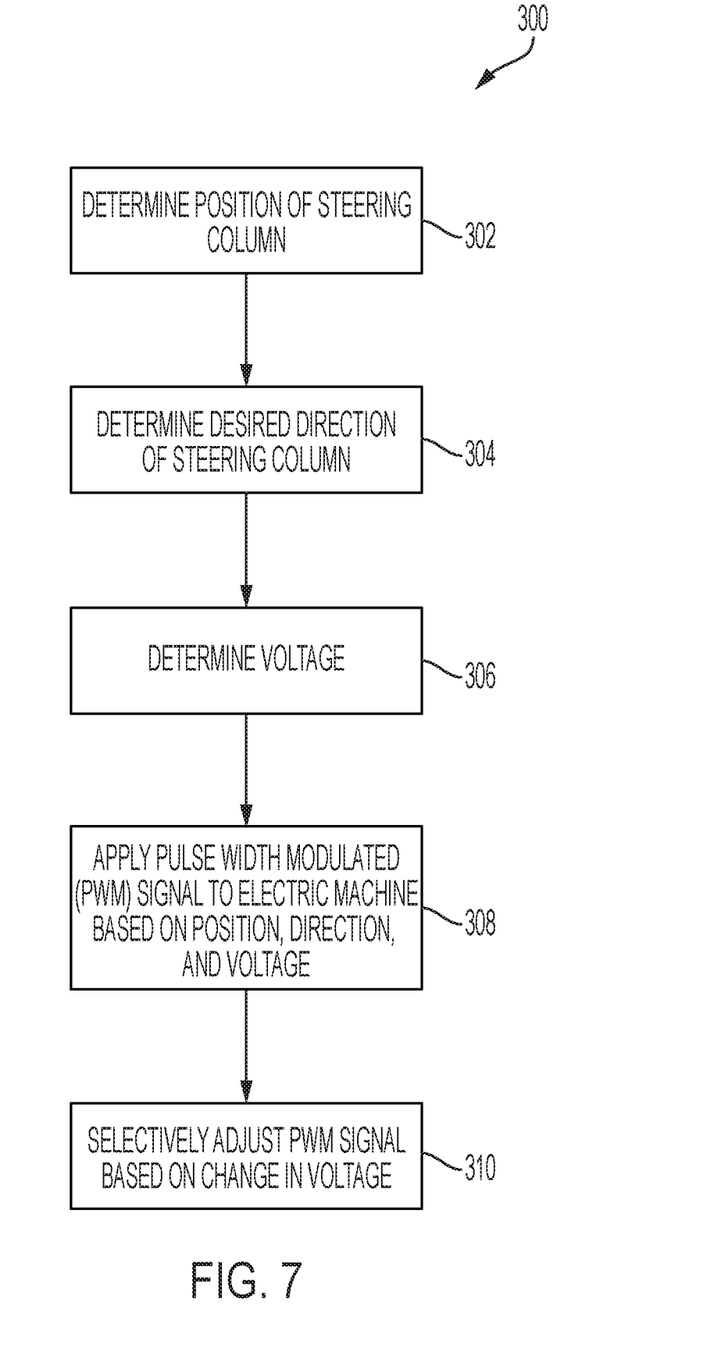
FIG. 7 is a flow diagram generally illustrating a method for controlling an electric machine according to the principles of the present disclosure.

FIG. 7 is a flow diagram generally illustrating the method 300 for controlling an electric machine 102 according to the principles of the present invention. At 302 in response to receiving a command signal, the method 300 determines a position of the steering column 118. For example, the controller 104 determines the position of the steering column 118 based on the position sensor 114.

At 304, the method 300 determines a desired direction of the steering column 118 based on the command signal. For example, the controller 104 determines the desired direction of the steering column 118.

At 306, the method 300 determines a voltage 116 corresponding to motion of the steering column 118 from the position and desired direction. For example, the controller 104 determines the voltage 116.

At 308, the method 300 applies a pulse width modulated signal to the electric machine 102 based on the position of the steering column 118, the desired direction of the steering column 118, and the voltage 116. For example, the controller 104 applies a pulse width modulated signal to the electric machine 102 based on the position of the steering column 118, the desired direction of the steering column 118, and the voltage 116.

At 310, the method 300 selectively adjusts the pulse width modulated signal based on a change in the voltage 116. For example, the controller 104 adjusts the pulse width modulated signal based on a change in the voltage 116.

In some embodiments, an apparatus for controlling an electric machine comprises a processor and a memory. The memory includes instructions that, when executed by the processor, cause the processor to: in response to receiving a command signal: determine a position of a steering column; determine a desired direction of the steering column based on the command signal; determine a voltage corresponding to motion of the steering column from the position and desired direction; apply a pulse width modulated signal to the electric machine based on the position of the steering column, the desired direction of the steering column, and the voltage; and selectively adjust the pulse width modulated signal based on a change in the voltage.

In some embodiments, the instructions further cause the processor to selectively adjust the pulse width modulated signal based on a change in the position of the steering column. In some embodiments, the instructions further cause the processor to selectively adjust the pulse width modulated signal in a proportional and non-linear relationship to change in the position of the steering column. In some embodiments, the instructions further cause the processor to determine the speed of the steering column and selectively adjust the pulse width modulated signal based on a difference in the pulse width modulated signal and the speed of the steering column. In some embodiments, the voltage is the digital high voltage of the pulse width modulated signal. In some embodiments, the electric machine is a permanent magnet direct current motor. In some embodiments, the apparatus includes a bell-crank operatively coupled to the electric machine.

In some embodiments, a method for controlling an electric machine comprises: in response to receiving a command signal: determining a position of a steering column; determining a desired direction of the steering column based on the command signal; determining a voltage corresponding to motion of the steering column from the position and desired direction; applying a pulse width modulated signal to the electric machine based on the position of the steering column, the desired direction of the steering column, and the voltage; and selectively adjusting the pulse width modulated signal based on a change in the voltage.

In some embodiments, the method includes selectively adjusting the pulse width modulated signal based on a change in the position of the steering column. In some embodiments, the method includes selectively adjusting the pulse width modulated signal in a proportional and non-linear relationship to change in the position of the steering column. In some embodiments, the method includes determining the speed of the steering column and selectively adjusting the pulse width modulated signal based the pulse width modulated signal and the speed of the steering column. In some embodiments, the voltage is a digital high voltage of the pulse width modulated signal. In some embodiments, the electric machine is a permanent magnet direct current motor. In some embodiments, the method includes the apparatus includes a bell-crank operatively coupled to the electric machine.

In some embodiments, an apparatus for controlling an electric machine comprises a processor and a memory. The memory includes instructions that, when executed by the processor, cause the processor to: in response to receiving a command signal: determine a position of a steering column; determine a desired direction of the steering column based on the command signal; determine a voltage corresponding to motion of the steering column from the position and desired direction; modify an output signal to the electric machine based on the position of the steering column, the desired direction of the steering column, and the voltage; and control a speed of the electric machine based on the output signal.

In some embodiments, the output signal is a pulse width modulated signal. In some embodiments, the instructions further cause the processor to selectively adjust the output signal based on a change in the position of the steering column. In some embodiments, the instructions further cause the processor to selectively adjust the output signal in a proportional and non-linear relationship to change in the position of the steering column. In some embodiments, the instructions further cause the instructions further cause the processor to determine the speed of the steering column and selectively adjust the output signal based on a difference in the output signal and the speed of the steering column. In some embodiments, the electric machine is a permanent magnet direct current motor. In some embodiments, the voltage is a digital high voltage of the pulse width modulated signal.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

The invention claimed is:

1. An apparatus for controlling an electric machine, the apparatus comprising:
    processing circuit; and a memory that includes instructions that, when executed by the processing circuitry, cause the processing circuitry to:
in response to receiving a command signal:
determine a position of a steering column;
determine a desired direction of the steering column based on the command signal;
determine a voltage corresponding to a system voltage supplied to the electric machine to move the steering column;
determine a duty cycle of a pulse width modulated signal based on a function of a rake angle of the steering column, the desired direction of the steering column, and the system voltage;
apply the pulse width modulated signal to the electric machine to change the position of the steering column; and
while applying the pulse width modulated signal to change the position of the steering column, selectively adjust the duty cycle of the pulse width modulated signal in response to changes in the system voltage and changes in the rake angle to maintain a constant speed of adjustment of the steering column.

2. The apparatus of claim 1, wherein the instructions further cause the processor processing circuitry to selectively adjust the pulse width modulated signal in a proportional and non-linear relationship to change in the position of the steering column.

3. The apparatus of claim 1, wherein the voltage is a digital high voltage of the pulse width modulated signal.

4. The apparatus of claim 1, wherein the electric machine is a permanent magnet direct current motor.

5. The apparatus of claim 1, wherein the apparatus includes a bell-crank operatively coupled to the electric machine.

6. A method for controlling an electric machine, the method comprising:
in response to receiving a command signal:
determining a position of a steering column;
determining a desired direction of the steering column based on the command signal;
determining a voltage corresponding to a system voltage supplied to the electric machine to move the steering column;
determining a duty cycle of a pulse width modulated signal based on a function of a rake angle of the steering column, the desired direction of the steering column, and the system voltage;
applying the pulse width modulated signal to the electric machine to change the position of the steering column; and
while applying the pulse width modulated signal to change the position of the steering column, selectively adjusting the duty cycle of the pulse width modulated signal in response to changes in the system voltage and changes in the rake angle to maintain a constant speed of adjustment of the steering column.

7. The method of claim 6, including selectively adjusting the pulse width modulated signal in a proportional and non-linear relationship to change in the position of the steering column.

8. The method of claim 6, including determining the speed of the steering column and selectively adjusting the pulse width modulated signal based on the pulse width modulated signal and the speed of the steering column.

9. The method of claim 6, wherein the voltage is a digital high voltage of the pulse width modulated signal.

10. The method of claim 6, wherein the electric machine is a permanent magnet direct current motor.

11. An apparatus for controlling an electric machine, the apparatus comprising:
a processor; and
a memory that includes instructions that, when executed by the processor, cause the processor to:
in response to receiving a command signal:
determine a position of a steering column;
determine a desired direction of the steering column based on the command signal;
determine a voltage corresponding to a system voltage supplied to the electric machine to move the steering column;
determine a duty cycle of a pulse width modulated signal based on a function of a rake angle of the steering column, the desired direction of the steering column, and the system voltage;
apply the pulse width modulated signal to the electric machine to change the position of the steering column;
while applying the pulse width modulated signal to change the position of the steering column, modify output duty cycle of the pulse width modulated signal in response to changes in the system voltage and changes in the rake angle to maintain a constant speed of adjustment of the steering column.

12. The apparatus of claim 11, wherein the instructions further cause the processor to selectively adjust the pulse width modulated signal in a proportional and non-linear relationship to change in the position of the steering column.

13. The apparatus of claim 11, wherein the electric machine is a permanent magnet direct current motor.

14. The apparatus of claim 13, wherein the voltage is a digital high voltage of the pulse width modulated signal.

* * * * *